Figure 1:
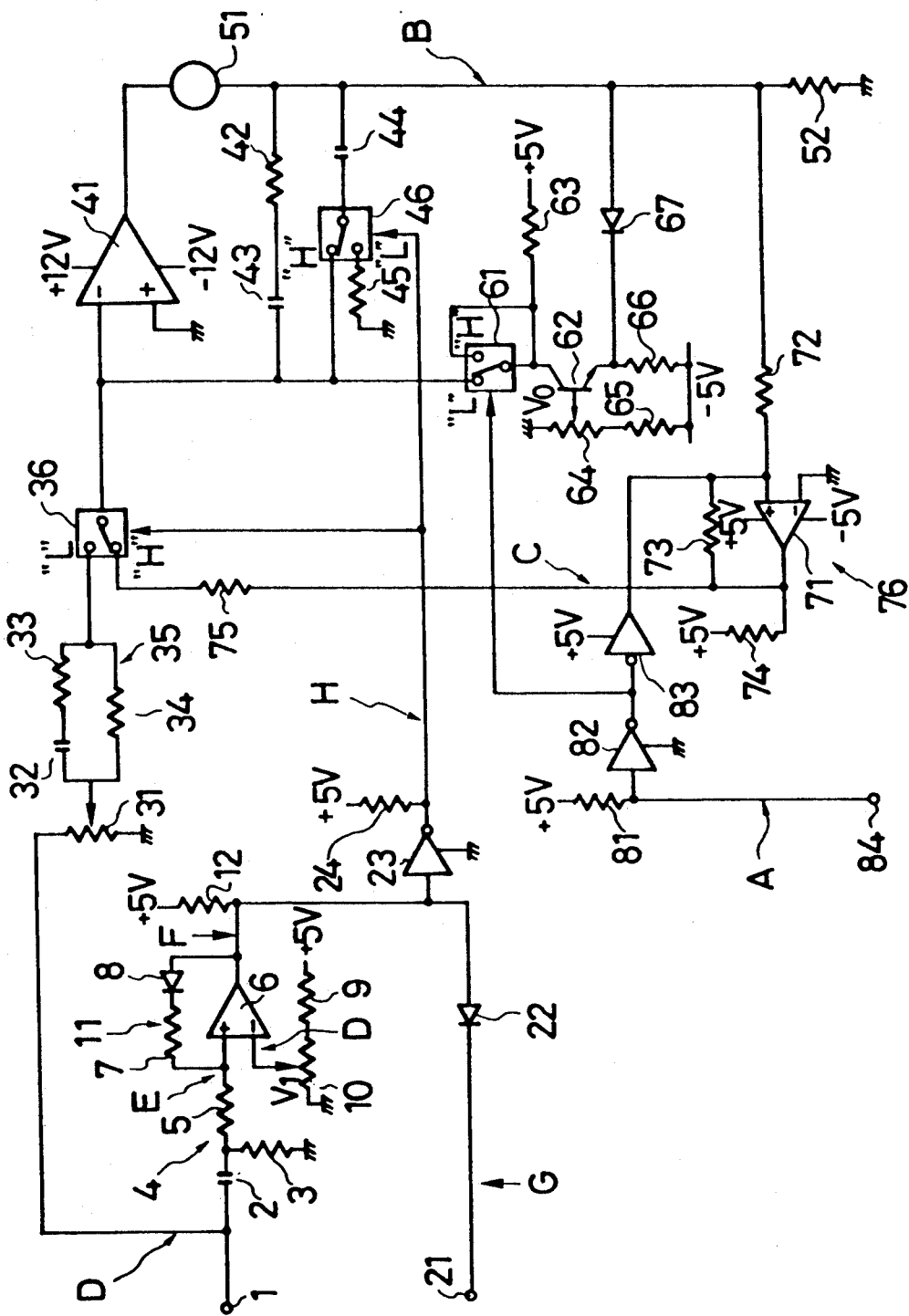

United States Patent [19]
Iwazaki

[11] Patent Number: 5,136,566
[45] Date of Patent: Aug. 4, 1992

[54] FOCUS ACTUATOR DRIVING APPARATUS

[75] Inventor: Syozi Iwazaki, Tokyo, Japan

[73] Assignee: Asahi Kogaku Kogyo Kabushiki Kaisha, Tokyo, Japan

[21] Appl. No.: 440,206

[22] Filed: Nov. 22, 1989

[30] Foreign Application Priority Data

Nov. 25, 1988 [JP] Japan .................. 63-297832

[51] Int. Cl.⁵ .............................. G11B 7/00
[52] U.S. Cl. .................. 369/44.25; 369/44.29; 369/44.35
[58] Field of Search .......... 369/32, 44.15, 44.25, 369/44.28, 44.27, 44.29, 44.34, 44.32, 44.35, 50; 358/342; 250/201.5

[56] References Cited

U.S. PATENT DOCUMENTS 3,896,304  7/1975  Aoki et al. ................. 250/201
4,488,275 12/1984  Ceshkovsky et al. ......... 369/44.37
4,630,121 12/1986  Suzuki et al. .............. 358/227
4,689,779  8/1987  Hayashi et al. ............. 369/44.32
4,733,066  3/1988  Konno et al. .............. 369/44.29 X
4,740,679  4/1988  Doi ....................... 369/44.29 X Primary Examiner—Roy N. Envall, Jr.
Assistant Examiner—Hung Dang
Attorney, Agent, or Firm—Sandler, Greenblum & Bernstein

[57] ABSTRACT

A driving circuit drives an actuator in accordance with either a driving signal or a focus error signal that is selected by a switching circuit. A capacitor, which is inserted in a feedback loop of the driving circuit, holds a driving voltage inputted to the driving circuit immediately before the switching of the switching circuit and applies the held voltage to the driving circuit at the time of the switching of the switching circuit.

12 Claims, 2 Drawing Sheets

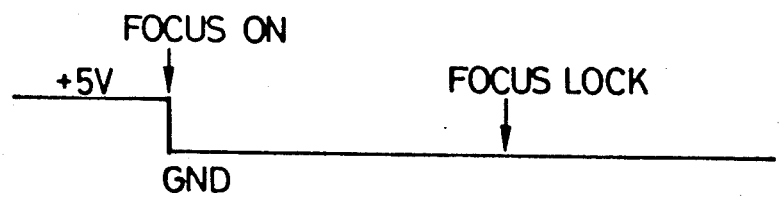
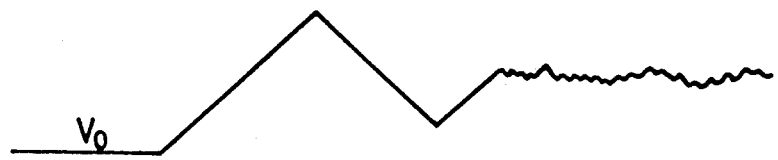
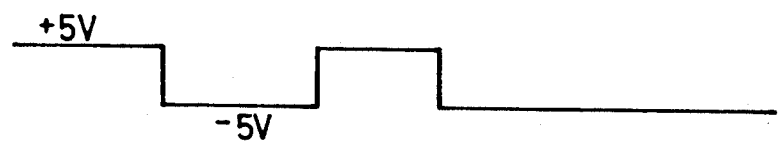
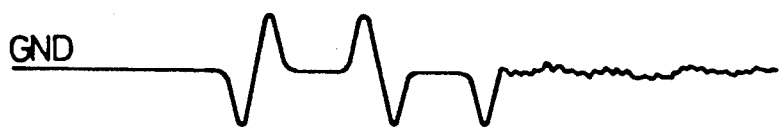
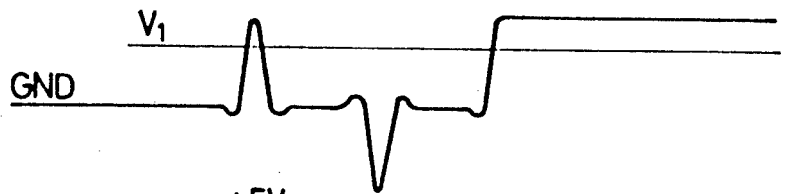
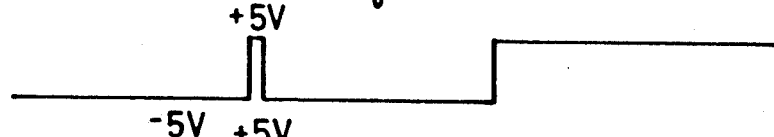
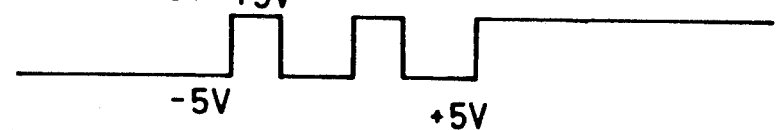

FOCUS ACTUATOR DRIVING APPARATUS

BACKGROUND OF THE INVENTION

This invention relates to a focus actuator driving apparatus for driving an actuator which moves an objective lens in a focus direction in an optical disk apparatus, such as a compact disk player or optical video disk player.

In an optical disk apparatus, it is necessary to lock in a focus servo loop before recording or playing back information. Therefore, when a commencement of the focus servo is initiated, a focus search is executed first. In the focus search mode, the actuator is driven with a driving signal whose level periodically changes between two specific levels. The objective lens results in repeating a movement of coming close to and going away from a disk. When the objective lens is located near a focus position where a laser beam for recording or playing back information is focused on a disk, the actuator is switched, being driven by a focus error signal instead of the driving signal, thus lacking in the focus servo loop.

In a conventional apparatus, however, because no current is supplied to the actuator at the moment of switching, the focus servo loop can not be locked in surely by a disturbance.

SUMMARY OF THE INVENTION

An object of this invention is to provide a focus actuator driving apparatus wherein a focus servo loop is locked in.

According to this invention, there is provided a focus actuator driving apparatus comprising an actuator for driving an objective lens to focus a light beam for recording or playing back information on a recording medium;

a generating circuit for generating a driving signal that periodically changes between a first level and a second level;

a first terminal to which a focus error signal is inputted;

a first switching circuit which is changed over to select one of either driving signals from the generating circuit and focus error signals from the first terminal;

a driving circuit for driving the actuator in accordance with a signal selected by the first switching circuit; and a first capacitor for holding a voltage inputted to the driving circuit immediately before a switching of the first switching circuit and for applying the held voltage to the driving circuit at the time of changeover of the first switching circuit.

Since a voltage for driving an actuator is charged in a capacitor and the actuator is driven by the charged voltage at the moment of switching, a focus servo loop is locked in without a disturbance.

BRIEF DESCRIPTION OF THE INVENTION

FIG. 1 is a circuit diagram of a preferred embodiment of the focus actuator driving apparatus according to this invention; and FIGS. 2A to 2H are timing charts for explaining an operation of the embodiment shown in FIG. 1.

PREFERRED EMBODIMENT OF THE INVENTION

In FIG. 1, a focus error signal is inputted to a terminal 1. Differentiating circuit 4 comprises a capacitor 2 and resistor 3. Comparator 11 comprises an operational amplifier 6, resistors 5 and 7, and a diode 8. A resistor 9 and variable resistor 10 generate a reference voltage to be supplied to the comparator 11. A resistor 12 connects an output terminal of the comparator 11 with a specific voltage source. The output terminal of comparator 11 is also connected to an input of invertor 23 comprising a NPN transistor; to the base thereof an input signal being supplied through a resistor, the emitter thereof being earthed, and connected with the base through another resistor and from the collector thereof a signal being outputted. The invertor 23 outputs a logic level L when a logic level H is inputted and the output of the invertor 23 is opened when the logic level L is inputted.

A focus sum signal is inputted to terminal 21. The focus sum signal is a window pulse with a width at the center of which a focus position with respect to a laser beam for recording and/or playing back information is located and which is generated, for example, by comparing a playback RF signal with a specific reference level. Diode 22 is inserted between terminal 21 and the input of invertor 23. Resistor 24 connects the output of invertor 23 to a specific voltage source.

Variable resistor 31 adjusts the level of the focus error signal that is inputted to terminal 1 and provides the signal to an equalizing circuit 35, comprising a capacitor 32 and resistors 33 and 34. Switch 36 selects either the focus error signals provided from the equalizing circuit 35 or a driving signal provided from a generating circuit 76 through a resistor 75.

Driving circuit 41 drives an actuator 51, that includes a coil in compliance with a signal provided from the switch 36 to a negative input terminal of the driving circuit 41. Resistor 52 converts a current flowing in the actuator 51 into a voltage.

In a feedback loop in the actuator 51 and driving circuit 41, a series circuit, comprising a resistor 42 and capacitor 43 is inserted. Also, a capacitor 44 is inserted in the feedback loop through a switch 46 which is inserted in parallel to the series circuit comprising the resistor 42 and capacitor 43. When switch 46 is switched over in a downward direction in FIG. 1, capacitor 44 is grounded through the switch 46 and a resistor 45.

The collector of transistor 62 is connected with a specific voltage source through a resistor 63 and with the input terminal of driving circuit 41 through a switch 61. A reference voltage produced by a variable resistor 64 and fixed resistor 65 is supplied to the base of transistor 62. The emitter of transistor 62 is connected through resistor 66 to a specific voltage source and through a diode 67 with resistor 52.

Resistor 52 is also connected to one end of resistor 72. The remaining end of resistor 72 is connected to a positive input terminal of comparator 71, which exhibits a hysteresis characteristic in the generating circuit 76, in which the negative input terminal of comparator 71 is grounded. Resistors 73 and 74 are inserted in the feedback loop of comparator 71 and connected with the output thereof, respectively.

A focus ON signal with a logic level L is inputted from a microcomputer not shown to terminal 84 for instance when a focus search operation is started and terminal 84 is connected with a specific voltage source through resistor 81.

Invertor 82 has an input which is connected to terminal 84. The output of invertor 82 is connected to the input of invertor 83, the output of which is connected to the positive input of comparator 71. The output of invertor 82 is also supplied to switch 61 for controlling the changeover.

Invertor 82 is operated in the same manner as in invertor 23. Invertor 83 comprises a PNP transistor; to the base thereof an input signal being supplied through a resistor, the emitter thereof being connected with a specific positive voltage source and with the base through another resistor and from the collector thereof a signal being outputted. Therefore, invertor 83 outputs a logic level H when a logic level L is inputted and the output of invertor 83 is opened when a logic level H is inputted.

The operation of the apparatus will now be described below with reference to the timing charts shown in FIG. 2.

When a focus search is not executed, a logic level H is inputted to terminal 84, as shown in FIG. 2A. Accordingly invertor 82 outputs a logic level L and switch 61 is changed over to the left, as shown in FIG. 1. The negative input of driving circuit 41 results in it being connected with a specific voltage source through transistor 62 and resistor 66. Also, since the base of transistor 62 is fixed to a voltage that is divided by resistor 64 and 65, the voltage of the emitter thereof is lower than the base voltage $V_0$ by a base-emitter voltage. Therefore, The voltage of resistor 52 is clamped to a voltage higher than the emitter voltage of transistor 62 by a forward voltage of diode 67. Because the forward voltage of diode 67 is equal to the base-emitter voltage of transistor 62, the voltage of resistor 52 is equal to the base voltage $V_0$ as shown in FIG. 2B.

Also, since the focus sum signal is a logic level L at this time, the input and output of invertor 23 are logic levels L and H respectively, as shown in FIGS. 2G and 2H, and switches 36 and 46 are changed over in downward and upward directions, respectively, as shown in FIG. 1.

When the focus ON signal comes to be a logic level L, as shown in FIG. 2A, the output of invertor 82 is opened and the positive voltage supplied to the emitter and base of a PNP transistor included in the invertor 83 is provided to switch 61. As a result, switch 61 is changed over right, as shown in FIG. 1 and the output (a collector of the PNP transistor) of invertor 83 is switched from a logic H to an open state. Therefore, since a voltage of resistor 52 is applied to the positive input terminal of comparator 71 instead of a logic level H which has been supplied from the invertor 83 til then, the output of comparator 71 is inverted to a logic level L, as shown in FIG. 2C. The output of comparator 71 is inputted to the negative input terminal of driving circuit 41 as a driving signal through resistor 75 and switch 36.

In the driving circuit 41, the driving signal is amplified in a reverse polarity, integrated in compliance with a time constant determined by capacitor 44 and resistor 75 and outputted to the actuator 51. As a result, an electric current flows in a route of the driving circuit 41, actuator 51 and resistor 52. At this time as shown in FIG. 2B, the voltage of resistor 52 increases gradually according to the increase of current. Thus, the objective lens, which is driven by the actuator 51, comes close to an optical disk, for instance.

When the objective lens reaches a specific position, the focus error signal is generated as shown in FIG. 2D. Furthermore, when the absolute level of focus error signal comes to be a specific level, the focus sum signal of a logic level H is inputted to terminal 21, as shown in FIG. 2G. Within the pulse range of the focus sum signal, the focus error signal changes the level thereof like a letter S. Namely it decreases gradually to a specific negative peak level, after that it increases gradually to a positive peak level and further decreases again to a zero level.

Differentiating circuit 4 differentiates the focus error signal inputted from terminal 1 and generates a peak signal which indicates the focus position, as shown in FIG. 2E. The signal outputted from differentiating circuit 4 is compared with a reference voltage $V_1$, defined by resistors 9 and 10, and the comparator 11 generates a pulse with a logic level H, the width of which is narrower than the focus sum signal and at the center of which the focus position is located, as shown in FIG. 2F. At this time, the focus sum signal is a logic level H, so the inputs of invertor 23 are all logic level H and the output thereof is a logic level L, as shown in FIG. 2H. As a result, switches 36 and 46 try to change to the up and down positions, respectively. However, when a timing is bad, the output of invertor 23 is inverted to a logic level H again and switches 36 and 46 can not be changed. At this time the focus servo loop can not be locked in and the objective lens passes over the focus position and comes close to the disk.

When the voltage of resistor 52 reaches the first level defined by a hysteresis characteristic of the comparator 71, the output of comparator 71 is inverted to a logic level H, as shown in FIG. 2C. The current that results flows in a reverse direction in actuator 51 and the voltage of resistor 52 gradually decreases, as shown in FIG. 2B. Thereby, the objective lens goes away from the disk. At this time, the objective lens again passes the focus position, however the differentiating circuit 4 outputs a negative peak as shown in FIG. 2E so that the output of comparator 11 is not inverted, as shown in FIG. 2F. Therefore, the focus servo loop does not lock-in.

When the voltage of resistor 52 decreases to the second level defined by the hysteresis characteristic, the output of comparator 71 is inverted again as shown in FIG. 2C and the direction of the current flow in actuator 51 is also inverted again. When the objective lens comes close to the focus position and the output of invertor 23 is inverted to a logic level L as shown in FIG. 2H, switches 36 and 46 are changed to the up and down, position, respectively. As a result, the focus error signal is equalized by the equalizing circuit 35 and provided to the driving circuit 41 through switch 36. Accordingly, thereafter, actuator 51 is driven in accordance with the focus error signal.

When switch 36 has been changed (either up or down), the input voltage of driving circuit 41 is charged in capacitor 43 via resistors 42 and 52. Accordingly, after switch 36 is removed from the lower contact (or upper contact) until it comes in contact with the upper contact (or lower contact), the voltage charged in capacitor 43 is inputted to the driving circuit 41. Therefore, even if a disturbance is generated at the time of switching, the objective lens is prevented from being moved thereby and the focus servo loop can be locked in.

The series circuit comprising resistor 42 and capacitor 43 functions as an equalizer together with the equalizing circuit 35. Accordingly, capacitor 43 and resistor 42 are selected so that the servo operation is not affected by them after the servo loop is locked in.

The charged voltage in capacitor 44 is discharged through resistor 45 when switch 46 is changed over to the down position.

What is claimed is:

1. A focus actuator driving apparatus, comprising:
   an actuator for driving an objective lens to focus a light beam for recording or playing back information on a recording medium;
   a generating circuit for generating a driving signal that periodically changes between a first level and a second level;
   a first terminal to which a focus error signal is inputted;
   a first switching circuit which is switched to select either said driving signal from said generating circuit or said focus error signal from said first terminal;
   a driving circuit for driving said actuator in accordance with a signal selected by said first switching circuit; and
   a first capacitor for holding a voltage inputted to said driving circuit immediately before the switching of said first switching circuit occurs and for applying said held voltage to said driving circuit at said time of said switching by said first switching circuit; and
   an equalizing circuit for equalizing said focus error signal, said first capacitor being inserted in a feedback loop of said driving circuit to equalize said focus error signal inputted to said driving circuit together with said equalizing circuit.

2. A focus actuator driving apparatus according to claim 1, wherein said apparatus further comprises:
   a differentiating circuit for differentiating said focus error signal; and
   a comparator for comparing an output of said differentiating circuit with a reference level and for producing a control signal for controlling said switching of said first switching circuit.

3. A focus actuator driving apparatus according to claim 2, wherein said apparatus further comprises a second terminal to which a focus sun signal is inputted, said second terminal being coupled to an output of said comparator to generate said control signal.

4. A focus actuator driving apparatus according to claim 1,
   wherein said apparatus further comprises a second capacitor for integrating said driving signal.

5. A focus actuator driving apparatus according to claim 4,
   wherein said apparatus further comprises a second switching circuit for inserting said second capacitor in a feedback loop of said driving circuit when said driving signal is applied to said driving circuit and for grounding said second capacitor when said focus error signal is applied to said driving circuit.

6. A focus actuator driving apparatus according to claim 5,
   wherein said second switching circuit is switched by said control signal together with said first switching circuit.

7. A focus actuator driving apparatus according to claim 1,
   wherein said apparatus further comprises a resistor for converting a current flowing through said actuator to a voltage, and further wherein said generating circuit comprises a comparator for comparing a voltage of said resistor with a reference level.

8. A focus actuator driving apparatus, comprising:
   and actuator for driving an objective lens to focus a light beam for recording or playing back information on a recording medium;
   a generating circuit for generating a driving signal that periodically changes between a first level and a second level;
   a first terminal to which a focus error signal is inputted;
   a first switching circuit which is switched to select either said driving signal from said generating circuit or said focus error signal from said first terminal;
   a driving circuit for driving said actuator in accordance with a signal selected by said first switching circuit;
   a first capacitor for holding a voltage inputted to said driving circuit immediately before the switching of said first switching circuit occurs and for applying said held voltage to said driving circuit at said time of said switching by said first switching circuit;
   means for modifying said focus error signal to form a modified focus error signal;
   means for comparing said modified focus error signal with a reference level and for producing at its output a control signal for controlling said switching of said first switching circuit; and
   a second terminal to which a focus sum signal is inputted, said second terminal being coupled to an output of said comparator to affect said control signal.

9. A focus actuator driving apparatus according to claim 8,
   wherein said apparatus further comprises a second capacitor for integrating said driving signal.

10. A focus actuator driving apparatus according to claim 9, wherein said apparatus further comprises a second switching circuit for inserting said second capacitor in a feedback loop of said driving circuit when said driving signal is applied to said driving circuit and for grounding said second capacitor when said focus error signal is applied to said driving circuit.

11. A focus actuator driving apparatus according to claim 10, wherein said second switching circuit is switched by said control signal together with said first switching circuit.

12. A focus actuator driving apparatus according to claim 8, wherein said apparatus further comprises a resistor for converting a current flowing through said actuator to a voltage, and further wherein said generating circuit comprises a comparator for comparing a voltage of said resistor with a reference level.

* * * * *

UNITED STATES PATENT AND TRADEMARK OFFICE
CERTIFICATE OF CORRECTION

PATENT NO. : 5,136,566
DATED : August 4, 1992
INVENTOR(S) : S. IWAZAKI

It is certified that error appears in the above-indentified patent and that said Letters Patent is hereby corrected as shown below:

```
At column 5, line 46 (claim 3. line 3). change "sun" to ---sum---.
At column 6, line 12 (claim 8. line 2). change "and" to ---an---.
```

Signed and Sealed this

Sixth Day of September, 1994

Attest:

BRUCE LEHMAN

*Attesting Officer*      *Commissioner of Patents and Trademarks*